United States Patent [19]

Depperman

[11] Patent Number: 5,568,893
[45] Date of Patent: Oct. 29, 1996

[54] INTERNAL WELDING FIXTURE

[75] Inventor: Warren B. Depperman, Lugoff, S.C.

[73] Assignee: Cogsdill Tool Products, Inc., Camden, S.C.

[21] Appl. No.: 332,241

[22] Filed: Oct. 31, 1994

[51] Int. Cl.⁶ .................................................. B23K 37/053
[52] U.S. Cl. ........................ 228/44.5; 228/49.3; 269/48.1
[58] Field of Search ................................. 228/44.5, 49.3; 269/48.1

[56] References Cited

U.S. PATENT DOCUMENTS

| | | | |
|---|---|---|---|
| 2,167,338 | 7/1939 | Murcell | 228/44.5 |
| 2,780,194 | 2/1957 | Croswell | 228/44.5 |
| 2,830,551 | 4/1958 | Miller | 228/44.5 |
| 2,906,226 | 9/1959 | Myrick et al. | 228/44.5 |
| 3,699,635 | 10/1972 | Bradley et al. | 269/48.1 |
| 3,979,041 | 9/1976 | Kaneyama et al. | 228/44.5 |
| 4,582,241 | 4/1985 | Johnson | 228/49.3 |
| 4,890,473 | 1/1990 | Westerman et al. | 72/402 |
| 5,285,947 | 2/1994 | Depperman | 228/49.3 |

Primary Examiner—P. Austin Bradley
Assistant Examiner—Jeffrey T. Knapp
Attorney, Agent, or Firm—Harness, Dickey & Pierce, P.L.C.

[57] ABSTRACT

An internal welding fixture is disclosed for locating and temporarily retaining two tubular workpieces relative to one another. The internal welding fixture includes a plurality of shoe assemblies, each of the shoe assemblies being radially disposed about a single axis and being radially movable between a contracted position and an expanded position. The shoe assemblies are equally divided into first and second groups of shoe assemblies. The internal welding fixture further includes a drive arrangement operatively connected to each of the shoe assemblies for moving each shoe assembly between its contracted position and its expanded position. The shoes of one of the groups of shoe assemblies are interconnected to the actuator through a delay mechanism which serves to mechanically delay retraction. Upon expansion of the shoe assemblies, the internal welding fixture is operative to reinforce and temporarily retain a joint formed between two tubular workpieces during a joining procedure, such as welding.

20 Claims, 5 Drawing Sheets

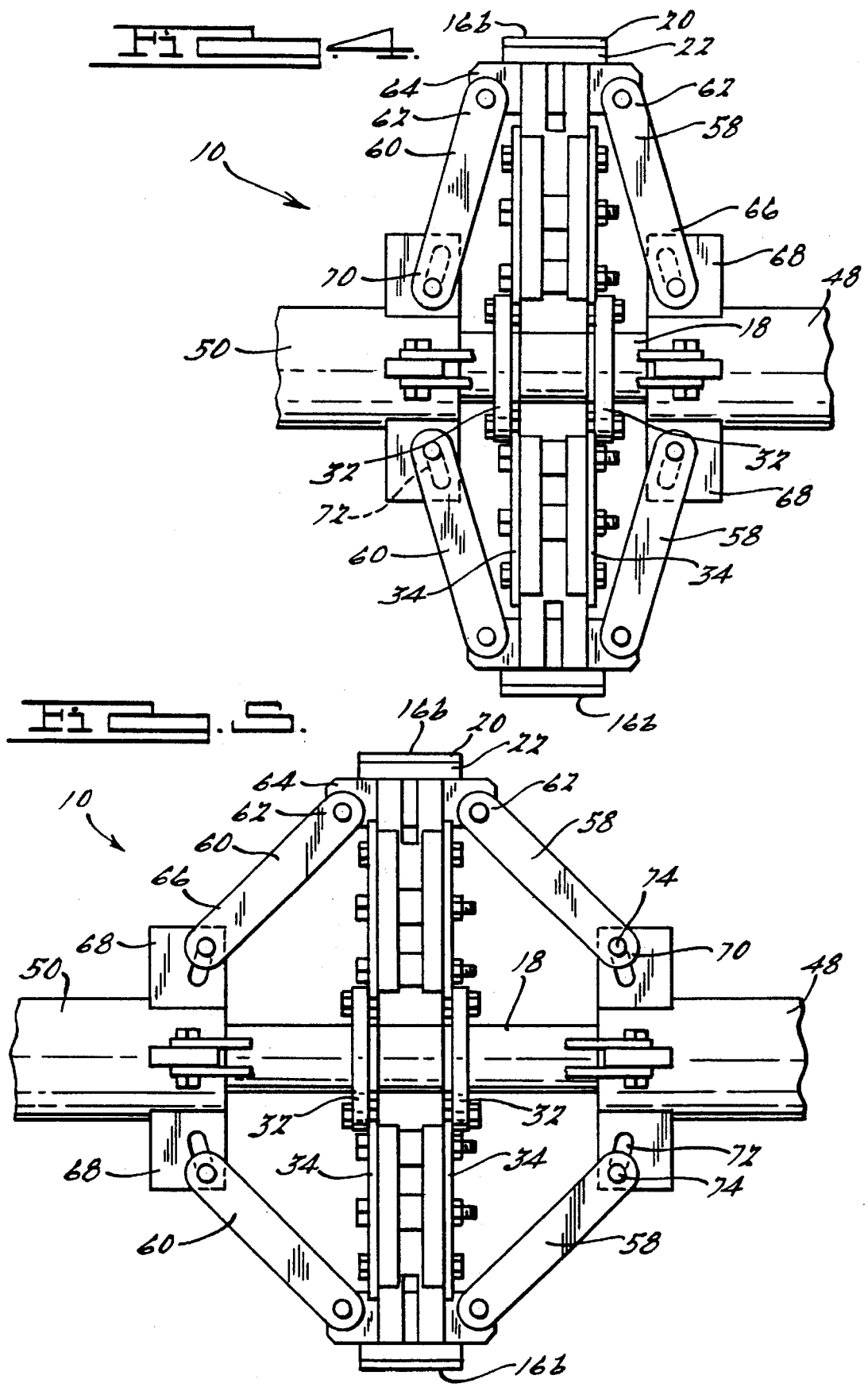

INTERNAL WELDING FIXTURE

BACKGROUND OF THE INVENTION

1. Technical Field

The present invention in general relates to a welding fixture, More particularly, the present invention relates to an internal fixture for supporting a joint between two tubular workpieces, and retaining the two workpieces relative to one another while the workpieces are being joined by a process such as welding.

2. Discussion

Welding fixtures are often employed during a joining operation of two workpieces, such as welding. The welding fixture serves to temporarily retain two or more workpieces relative to one another. Preferably, the welding fixture also functions to support the joint formed between the two workpieces during the joining process. Various tools have been previously devised in attempts to permit one workpiece to be temporarily aligned and supported with a mating workpiece while the two workpieces are fixedly secured together by a joining procedure. While such devices have proven to be commercially acceptable for a wide range of applications, either alone or in cooperation with additional clamping devices, all are subject to improvement.

One known device is described in commonly owned U.S. Pat. No. 5,285,947, which issued on Feb. 15, 1994 and is entitled Welding Fixture. U.S. Pat. No. 5,285,947, expressly incorporated by reference as if fully set forth herein, is directed to an internal welding fixture adapted to assist in the joining of two tubular workpieces. The fixture includes a first group of extendable shoes driven by a first actuator and a second group of extendable shoes driven by a second actuator. The shoes cooperate to form a substantially continuous backup along the joint formed between the two workpieces. The first and second groups of shoes can independently retract to an interleaved position.

While prior devices have satisfactorily operated in most applications, disadvantages are inherent in these same devices under particular circumstances. In this regard, a need remains for a welding fixture adapted to temporarily retain a first tubular workpiece relative to a second tubular workpiece while the first and second workpieces are permanently joined which is controlled by a single actuator and can be axially centered with respect to one of the tubular workpieces. Most previously developed tools are generally unsuited for supporting the joint between the two workpieces as the workpieces are rotated and exteriorly welded. For example, in such applications, most prior welding fixtures require contact with the exterior of the workpieces, thereby interfering with the welding procedure. Furthermore, many previously developed welding fixtures are weight prohibitive in that they are unsuitable due to the damage they would cause where the workpieces are constructed from light weight metals, such as aluminum, or very thin metal. Other previously developed welding fixtures are also unsuited to substantially continuously support the joint formed between two tubular workpiece sections by only engaging the interior perimeters of the sections.

Still yet, other previously developed welding fixtures require multiple actuators for complete internal joint backup of tubular workpieces and are not adapted to axially center themselves with respect to a tubular workpiece.

It is therefore a principal object of the present invention to provide a welding fixture which is capable of quickly and accurately securing two tubular workpieces temporarily relative to one another from the interior of the workpieces, without the aid of any other clamping mechanism or support device.

It is a further object of the present invention to provide an internal welding fixture sufficiently light so as to not damage thin wall tubing.

It is still a further object of the present invention to provide an internal welding fixture which substantially provides continuous support about the perimeter of a joint formed between two axially aligned tubular workpieces.

Yet still another object of the present invention is to provide an internal welding fixture adapted to conform the perimeter of a generally tubular workpiece to a uniform radius of curvature.

Another object of the present invention is to provide an internal welding fixture which provides accurate internal alignment and reforming of pipe while reducing fit-up times.

SUMMARY OF THE INVENTION

The above and other objects are accomplished by providing an internal welding fixture constructed in accordance with the teachings of the present invention. In a first form thereof, the present invention provides an internal welding fixture adapted for temporarily retaining two tubular workpieces relative to one another. The internal welding fixture generally comprises a plurality of shoe assemblies which includes two groups of shoe assemblies. Each shoe assembly of the plurality of shoe assemblies is axially arranged about a single axis, and is radially movable between a contracted position and an extended position. The internal welding fixture further comprises a drive arrangement operatively connected to each of the shoe assemblies. The drive arrangement is selectively operable for moving each shoe assembly between its contracted position and extended position. The internal welding fixture further includes a delay mechanism for mechanically delaying the initiation of retraction of the shoe assemblies of the second group of shoe assemblies. The delay mechanism functions so as to retract only the shoe assemblies of the first group during a first time interval and to retract each shoe assembly of the plurality of shoe assemblies during a second, subsequent time interval.

In a second form thereof, the present invention provides a locating arrangement for an internal welding fixture of the type including a plurality of shoe assemblies axially arranged about an axis and radially moveable between an extended position and a contracted position. The internal welding fixture further being of the type adapted to internally backup a joint formed between adjacently disposed first and second tubular workpieces. The locating arrangement includes a plurality of actuators axially disposed equally about the axis. Each actuator of the plurality of actuators includes a radially extendable arm portion.

BRIEF DESCRIPTION OF THE DRAWINGS

Various advantages of the present invention will become apparent to those skilled in the art by reading the following specification and subjoined claims and by referencing the following drawings in which:

FIG. 4 is a simplified side elevational view similar to FIG. 2 showing the internal welding fixture rotated 90° about its central mast;

FIG. 5 is a simplified side elevational view similar to FIG. 4 showing the shoe assemblies of the internal welding fixture in a fully retracted position;

FIG. 8 is a side view of the second set of wheels of the internal welding fixture shown in FIG. 1.

DETAILED DESCRIPTION OF THE PREFERRED EMBODIMENTS

Throughout the drawings, the teachings of the present invention are shown incorporated into a particular embodiment. However, it should be appreciated that the teachings of the present invention are equally applicable to a wide range of uses and the illustrated embodiment is merely exemplary. The embodiment illustrated is specifically applicable in aiding in the welding of two tubular sections, or pipes. For example, such a welding operation is desirable in the fabrication of liquid transporting tanker trailers. Additional applications include but are not limited to automatic welding, submerged-arc welding, double-joining of pipe, and pipeline work.

Figure 1:
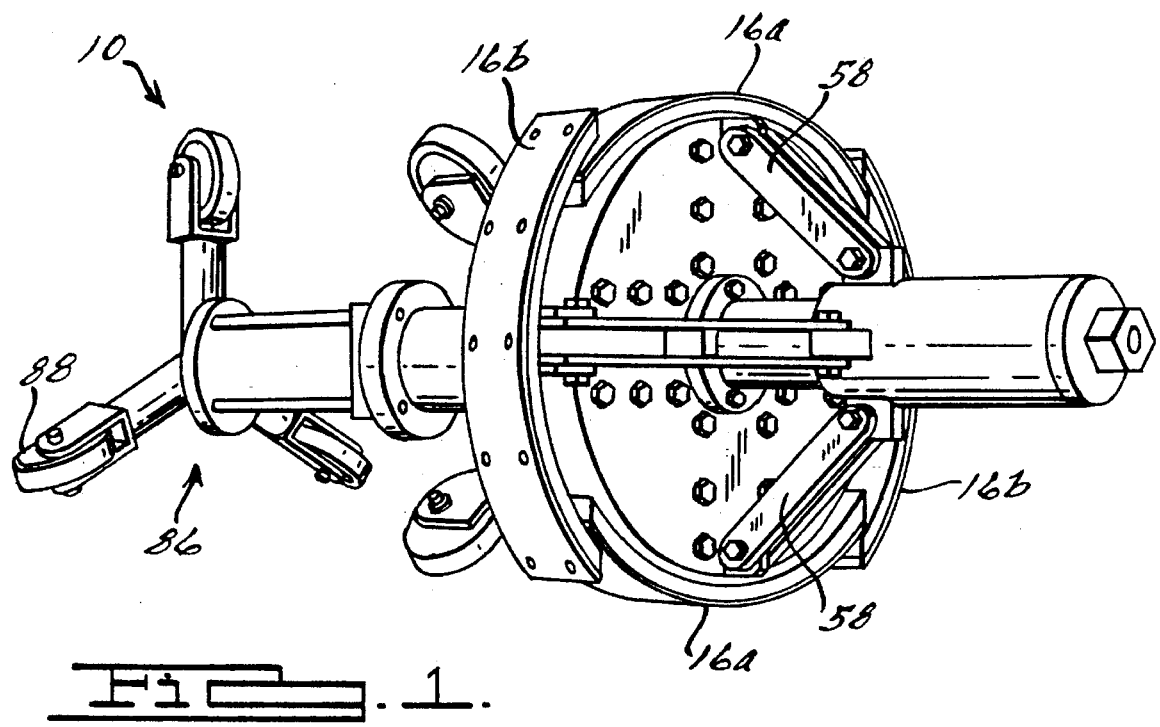
FIG. 1 is a perspective view of the internal welding fixture of the present invention constructed in accordance with the teachings of the present invention.
Figure 2:
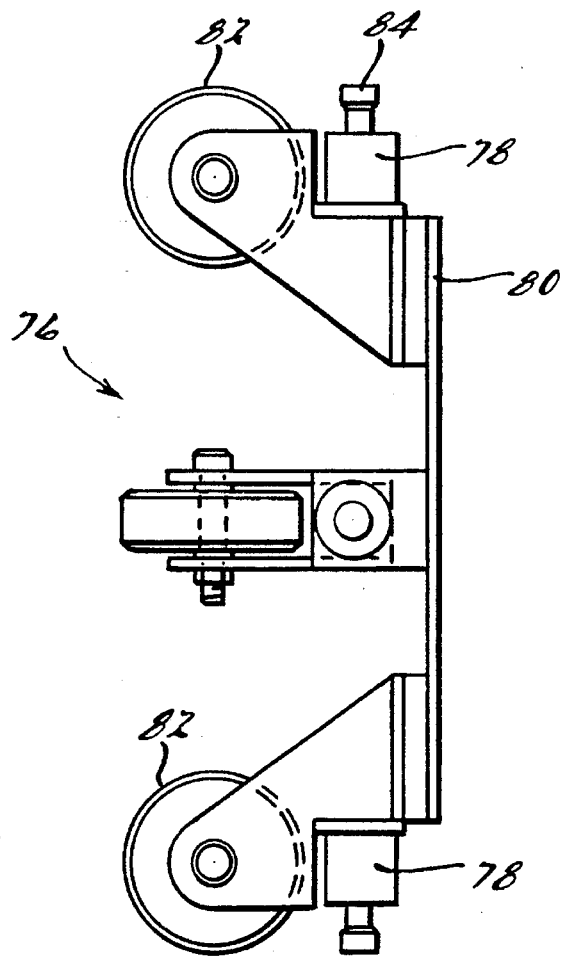
FIG. 2 is a partial cross-sectional view of the internal welding fixture of FIG. 1 showing the fixture in a fully extended, operative position in cooperation with two tubular workpieces (shown in phantom)
Figure 2:
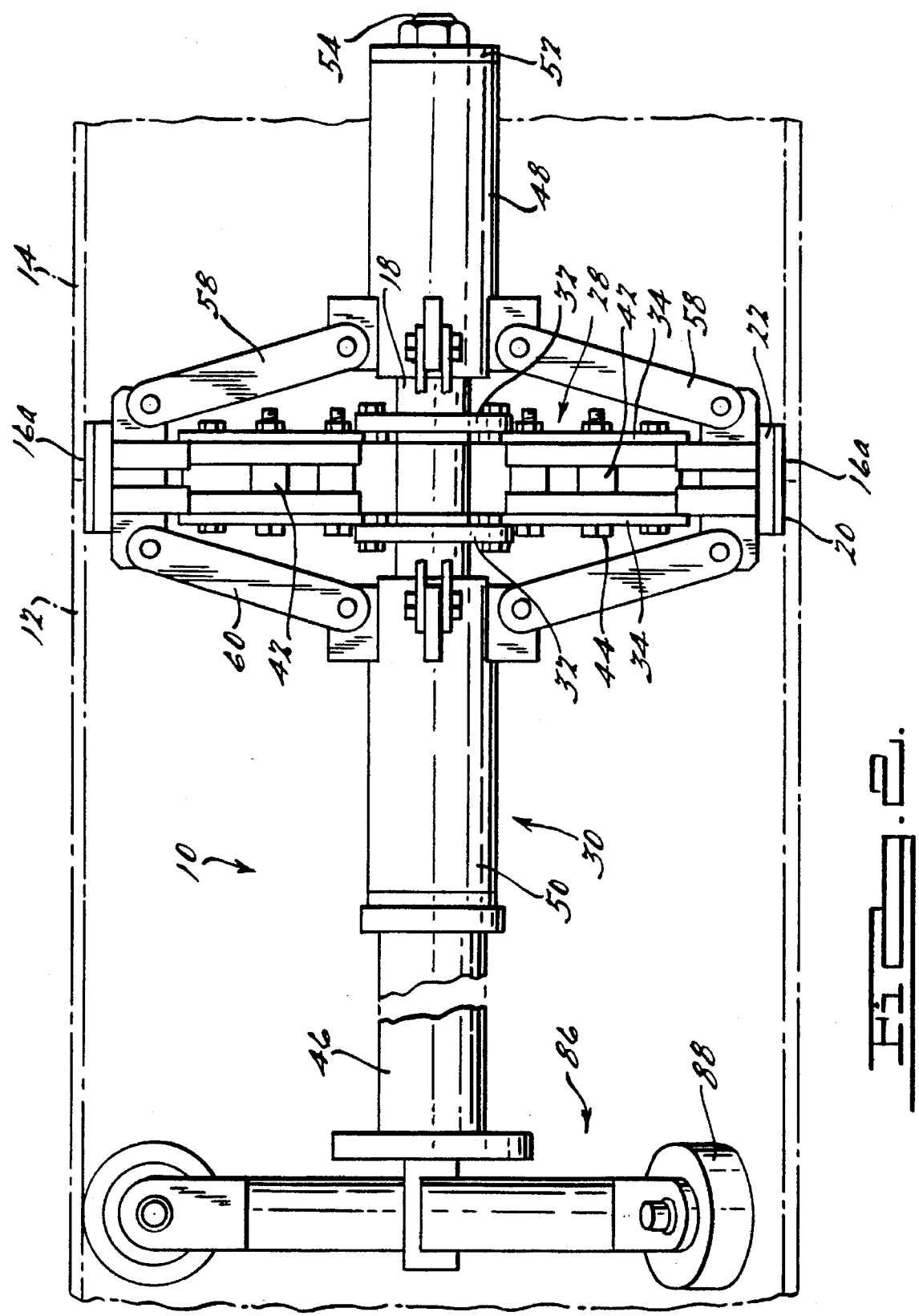

Referring generally to FIGS. 1–7, an internal welding fixture constructed in accordance with a preferred embodiment of the present invention is shown and generally designated with the reference numeral 10. In FIG. 2, the internal welding fixture 10 is shown operatively associated with two generally tubular workpieces, or pipes 12, 14 (shown in phantom).

The internal welding fixture 10 of the present invention preferably includes a plurality of shoe assemblies 16 axially arranged about an axis defined by a central mast 18. Each of the shoe assemblies 16 is movable between a contracted position (see FIGS. 1, 3, 5 and 7) and an extended position (see FIGS. 2, 4 and 6). As shown throughout the Figures, in the exemplary embodiment illustrated, the internal welding fixture 10 includes four (4) shoe assemblies 16. The shoe assemblies 16 are operatively arranged into first and second groups of shoe assemblies 16a, 16b. In the preferred embodiment, shoe assemblies common to each group of shoe assemblies are diametrically disposed about the axis defined by the central mast 18.

For the sake of simplicity, FIGS. 2–5 illustrate the internal welding fixture 10 of the present invention to include only two shoe assemblies 16. The shoe assembly extending out from the page has been substantially eliminated in order to further a clear understanding of the present invention. The internal welding fixture 10 is particularly suited to be used during the joining of two tubular workpieces 12, 14 having substantially identical internal diameters, which are to be joined substantially coaxially relative to each other. Additionally, the internal welding fixture 10 is adapted to reform a generally cylindrical workpiece to a uniform radius.

It will be appreciated by those skilled in the art that the number of shoe assemblies 16 is readily susceptible to change in order to accommodate a particular application. Of significance is the outer distance between two directly opposite facing shoe assemblies 16 when fully extended, and thereby the overall diameter of the fixture 10. This distance is adapted to be substantially equivalent to the inner diameter of the tubular workpieces 12,14 which are to be reformed and/or joined. In the exemplary embodiment illustrated, the overall diameter of the internal welding fixture 10, while fully extended, is preferably between 16 and 48 inches. However, it will be appreciated by those skilled in the art that dimensions greater than and less than the given range can be readily obtained without departing from the scope of the present invention.

In the exemplary embodiment incorporating four shoe assemblies 16, a nominal gap of approximately ⅛ inches exists between adjacent shoe assemblies 16 upon full extension. As will be appreciated more fully below, this nominal gap affords clearance for the shoe assemblies 16 of the first group, designated as 16a, to be retracted from their extended positions radially adjacent the shoe assemblies 16 of the second group, designated as 16b. In applications requiring smaller tolerances, an increased number of shoe assemblies 16 can be incorporated to reduce the resultant gap between adjacent shoe assemblies 16. For example, design of the present invention to incorporate sixteen (16) shoe assemblies 16 results in a nominal gap of approximately 1/32 inches between adjacent shoe assemblies 16 at full extension.

In the exemplary embodiment, each shoe assembly 16 includes an outer plate portion 20 and an inner plate portion 22. The outer plate portion 20 of each shoe assembly 16 is preferably constructed of copper and has a radius of curvature substantially equivalent to the radius of curvature of the internal diameters of the tubular workpieces 12,14. Preferably, the outer plate 20 portion is formed to include a groove (not shown) axially extending around the outer perimeter thereof. As will be appreciated by those skilled in the art, during welding the groove functions to retain the weld puddle and thereby form an internal bead (not shown) for the weld. The conductivity of the copper serves to quickly chill the weld puddle and thereby prevents sticking of the weld seam to the internal welding fixture 10. Further, in the exemplary embodiment, the outer plate portion 20 has an outer perimeter substantially equivalent to ¼ of the inner perimeter of the workpieces 12, 14.

The inner plate portion 22 is preferably constructed of steel. The outer plate portion 20 is attached to the inner plate portion 22 by a plurality of bolts (not shown). However, it will be appreciated by those skilled in the art that the outer plate portion 20 may be attached to the inner plate portion 22 by any of a number of suitable well known techniques.

In the preferred embodiment, the ends of the inner and outer plate portions 20, 22 are bevelled to facilitate complete retraction of the shoe assemblies 16. In this regard, the inner and outer plate portions 20, 22 of the shoe assemblies 16 of the second group of shoe assemblies 16b are bevelled to form a planar surface 24 (see FIGS. 6 and 7) substantially parallel to the direction of travel of the shoe assemblies 16 of the first group. Analogously, the outer plate portions 20 of the shoe assemblies 16a of the first group are bevelled to include a planar surface 26 (see FIGS. 6 and 7) substantially parallel to the direction of travel of the shoe assemblies of the first group 16a.

The internal welding fixture 10 of the present invention further includes a shoe assembly support structure 28 and a drive arrangement 30 operatively connected to each of the shoe assemblies 16 for selectively moving each of the shoe assemblies 16 between the contracted position and the extended position.

The shoe assembly support structure 28 preferably includes a pair of mounting flanges 32 attached to the central mast 18 and a pair of mounting plates 34 dependent therefrom. The shoe assembly support structure 28 further includes a plurality of slide rails 36, a shoe support tube 38 and a shoe supporting ring 40 associated with each of the shoe assemblies 16. Each of the mounting flanges 32 includes an aperture (not shown) through which the central mast 18 is permitted to pass. The central mast 18 is permanently attached to one or more of the mounting flanges 32 so that the central mast is fixed relative to the support structure 28.

The shoe support tube 38 is attached to the inner plate portion 22 of each shoe assembly 16 and is adapted to be slideably retained between the pair of mounting plates 34. In this regard, a first pair of slide rails 36 is disposed in a parallel relationship adjacent one of the mounting plates 34. Similarly, a second pair of slide rails 36 is disposed adjacent the other mounting plate 34. A plurality of spacers 42 serves to maintain the two halves of the support structure 28 in a spaced apart relationship. Bolts 44 pass through the mounting plates 34, slide rails 36 and spacers 42 to hold the support structure 28 together.

The shoe support ring 40 is attached to the inner plate portion 22 and shoe support tube 38 of each shoe assembly 16 to provide structural support so that each shoe assembly can withstand the high loads that are applied.

As illustrated throughout the Figures, the internal welding fixture 10 of the present invention further comprises a drive arrangement 30 adapted for contracting and extending the shoe assemblies 16. The drive arrangement 30 preferably includes a hydraulic actuator 46, first and second cylindrical tube portions 48, 50 and a piston rod extension 52. A suitable hydraulic actuator 46 is commercially available from Grainger as Part No. 4Z191. As shown in FIG. 2, the hydraulic actuator 46 is operatively connected with the piston rod extension 52 which passes through a substantial portion of the central mast 18. The piston rod extension 52 passes through an end cap 54 and is fastened thereto with a nut 56.

The first and second cylindrical tube portions 48, 50 are disposed on opposite sides of the shoe assembly structure 28. The first cylindrical tube portion 48 is fastened to the end cap 54 connected to the piston rod extension 52 in any manner well known in the art. Both cylindrical tube portions 48 and 50 include an aperture passing therethrough and are adapted to translate along the cylindrical mast 18. In the preferred embodiment, bronze bearings 51 are located between the central mast 18 and each of the cylindrical tube portions 48 and 50.

In use, as the hydraulic actuator 46 advances the piston rod extension 52, the cylindrical tube portions 48 and 50 are equally advanced in a direction away from the support structure 28. As will become more apparent below, as the piston rod extension 52 is extended, the shoe assemblies 16 of the internal welding fixture 10 contract.

Each of the shoe assemblies 16 is interconnected to the first cylindrical tube portions 48 through a first support arm 58. Similarly, each of the shoe assemblies 16 is interconnected to the second cylindrical tube portion 50 through a second support arm 60. At a first end 62, the first and second support arms 58, 60 are pivotally attached to a mounting plate 64 attached to the shoe support ring 40 of each shoe assembly 16. At their second ends 66, the first and second shoe support arms 58, 60 are pivotally attached to ears 68 located on the first and second cylindrical tube portions 48, 50. Briefly, as the cylindrical tube portions 48 and 50 are advanced away from the support structure 28, the first and second support arms 58, 60 draw each of the shoe assemblies 16 radially inward.

In the preferred embodiment illustrated throughout the Figures, the internal welding fixture 10 further includes an actuator mechanism for delaying the initiation of retraction and extension of the shoe assemblies 16 of the second group of shoe assemblies 16b. In the preferred embodiment, the actuator mechanism include a slip joint 70 associated with each of the first and second support arms 58, 60 for the shoe assemblies 16 of the second group of shoe assemblies 16b. As shown in FIGS. 4 and 5, each of the slip joints 70 includes an elongated aperture 72 passing through the respective ear 68 for the support arm 58, 60 through which a pin 74 is permitted to pass. As will be discussed further below, as the shoe assemblies 16 are initially retracted or initially extended, the pin 74 passes along the length of its respective elongated aperture 72 until it encounters the resistance of the opposite end. Throughout this period of pin 74 travel, the shoe assemblies 16a of the first group are radially moved either inward or outward, while the shoe assemblies 16b of the second plurality are momentarily stationary.

Referring additionally to FIG. 8, the internal welding fixture 10 of the present invention further includes a locating arrangement 76 for locating and centering the fixture 10 within one of the first and second tubular workpieces 12, 14. In the preferred embodiment, the locating arrangement 76 includes a plurality of hydraulic cylinders 78 axially disposed about the central mast 18. A suitable hydraulic cylinder 78 is commercially available from Mack Corporation as Part No. S3515-6-37-1lTW. Further in the preferred embodiment, the hydraulic cylinders 78 are four (4) in number and are part of a locating arrangement 76 which also includes one of the mounting plates 34 with a plurality of wheels 82 spaced axially thereon. Each of the hydraulic cylinders 78 is associated with an extendable arm 84 moveable between a non-actuated, radially inward position and an actuated, radially outward position.

Figure 3:
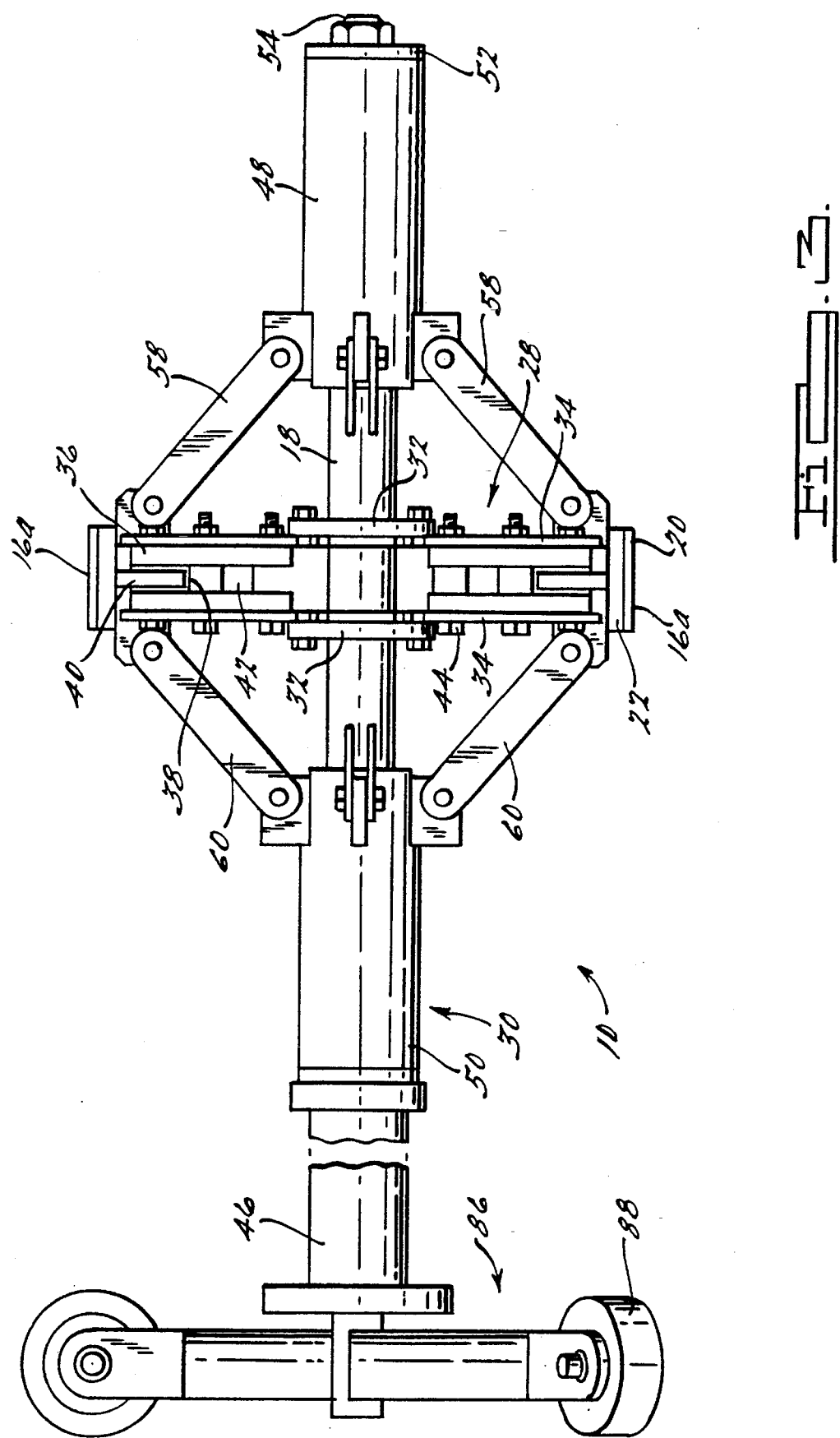
FIG. 3 is a partial cross-sectional view similar to FIG. 2 showing the shoe assemblies of the internal welding fixture in a fully retracted position.

As shown in FIGS. 1–3, the internal welding fixture 10 of the present invention further includes a base unit 86 attached to the free end of the hydraulic cylinder 46 which includes a plurality of wheels 88. The plurality of wheels 88 of the base unit 86 preferably includes three (3) wheels which are operative for transportation of the internal welding fixture 10 inside the first and second tubular workpieces 12, 14. In the operative position, the central mast 18 is substantially horizontal. Preferably, the wheels 88 of the base unit 86 are radially spaced apart such that all three (3) wheels 88 contact the interior perimeter of the cylindrical workpieces 12, 14, thereby centering the hydraulic cylinder end of the internal welding fixture inside the cylindrical workpieces 12, 14.

THE OPERATION OF THE FIXTURE ASSEMBLY

With particular reference to FIGS. 1–7, the operation of the present invention as heretofore detailed will now be described. Immediately prior to use, the internal welding fixture 10 is oriented such that the axis defined by the central mast 18 is substantially horizontal, as shown in FIG. 1. Typically, with the shoe assemblies 16 fully retracted, the second end of the central mast 18 is advanced into the first tubular workpiece 12. The internal welding fixture 10 is positioned so that the groove (not shown) about the outer periphery of the shoe assemblies 16 is substantially adjacent the end of the first tubular workpiece 12.

Next, the hydraulic cylinders 78 of the locating arrangement 76 are actuated causing the extendable arms 84 of each hydraulic cylinder 78 to advance radially outward. The arms 84 of the hydraulic cylinder 78 engage the internal diameter of the first tubular workpiece 12, thereby locating and centering the internal welding fixture 10 with respect to the first tubular workpiece 12. At this point, the second tubular workpiece 14 is brought into an axially adjacent relationship with the first tubular workpiece 12.

Once the two tubular workpieces 12, 14 are axially adjacent, each of the shoe assemblies 16 are fully expanded so as to engage the internal diameter of the first and second tubular workpieces 12, 14, conform the first and second tubular workpieces 12, 14 to a uniform radius, and perform a substantial continuous backup of the joint form between the first and second tubular workpieces 12, 14. To accomplish radial extension of the shoe assemblies 16, the piston rod extension 52 disposed within the center mast 18 is retracted toward the hydraulic cylinder 46. Retraction of the piston rod extension 52 causes the cylindrical portions 48 and 50 to move toward the shoe assembly support structure 28. As the distance between the first and second cylindrical portions 48, 50 decreases, the shoe assemblies 16 are extended.

The pivotal interconnection of the shoe assemblies 16 and the first and second cylindrical portions 48, 50 through the first and second support arms 58, 60 causes the shoe assemblies 16 to be driven radially. When the shoe assemblies 16 are fully retracted, the pins 74 associated with the slip joints 70 of the first and second support arms 58, 60 of the shoe assemblies 16 are at a radially outward position (as shown in FIG. 5). Movement of the cylindrical portions 48 and 50 toward the support structure 28 during a first time interval causes the pins 74 of the slip joints 70 to move radially inward along the elongated aperture 72 until the pin engages the opposite end of its respective aperture. During this first interval of time, radial movement of the shoe assemblies of the second group of shoe assemblies 16b is momentarily arrested. Simultaneously during this first interval of time, the shoe assemblies of the first group of the shoe assemblies 16a are radially advanced outward to an intermediate position. During a second interval of time, further reduction of the distance between the cylindrical portions 48 and 50 extends the shoe assemblies of both the first and second shoe assemblies 16a, 16b to their fully extended positions (see FIG. 6).

Figure 6:
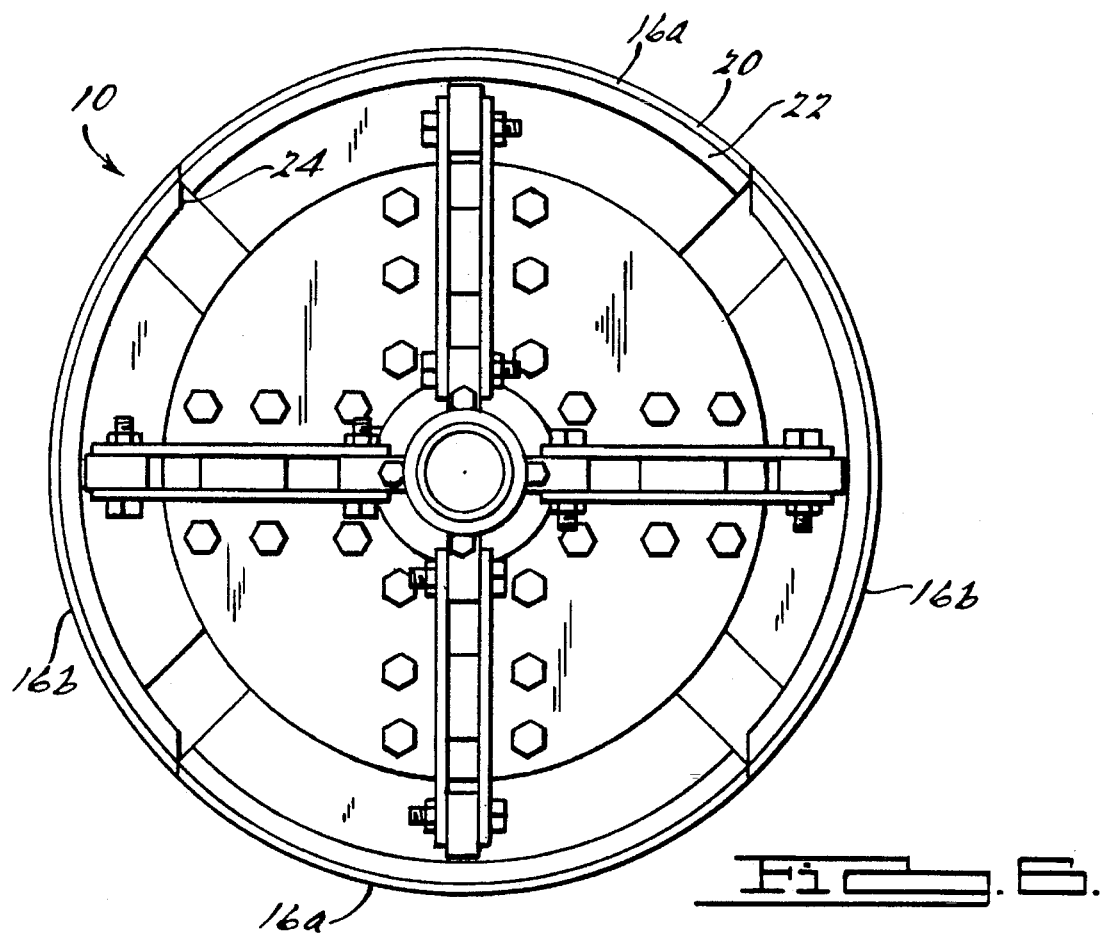
FIG. 6 is an end view of the internal welding fixture of FIG. 1 showing the shoe assemblies in a fully extended position.
Figure 7:
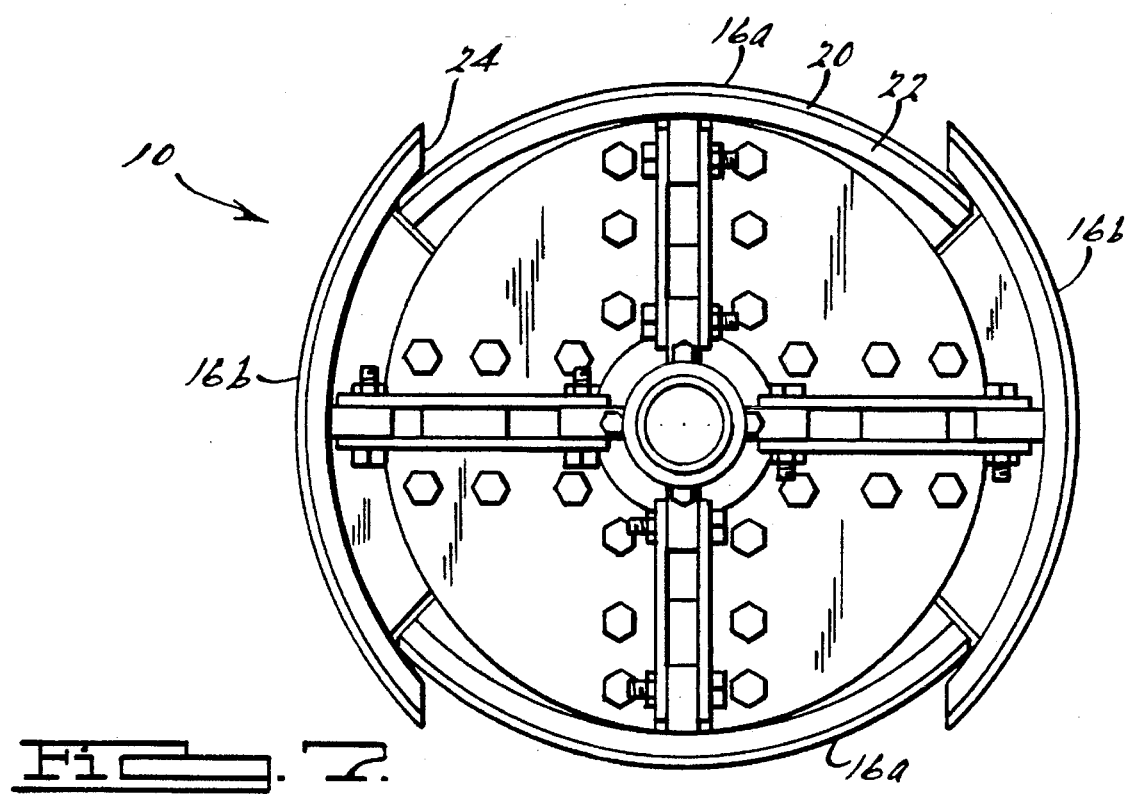
FIG. 7 is an end view of the internal welding fixture of FIG. 1 showing the shoe assemblies in a fully retracted position.

Retraction of the shoe assemblies 16 is accomplished in substantially the reverse order as extension and, therefore, need not be described in great detail. Assuming the shoe assemblies 16 of the internal welding fixture 10 of the present invention to be fully extended, as shown in FIG. 6, the pins 74 of each of the slip joints 70 are located at a radially inward position along the respective elongated aperture 72 (see FIG. 4). The shoe assemblies of the second group of shoe assemblies 16b are not moved radially inward until the cylindrical portions 48 and 50 are separated sufficiently for the pins 74 to pass to the opposite ends of the respective elongated apertures 72. During a second time interval, further separation of the cylindrical portions 48 and 50 retracts the shoe assemblies of both the first and second shoe assemblies 16a, 16b to their fully retracted positions (as shown in FIG. 7).

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An internal welding fixture for use in joining two tubular workpieces, the fixture comprising:

a plurality of shoe assemblies including a first group of shoe assemblies and a second group of shoe assemblies, each shoe assembly of said plurality of shoe assemblies being radially arranged about an axis and each shoe assembly of said plurality of shoe assemblies further being radially moveable between a contracted position and an extended position;

a drive arrangement including a single piston rod operatively interconnected to each shoe assembly of said plurality of shoe assemblies for moving each shoe assembly of said plurality of shoe assemblies between said contracted position and said extended position; and a delay mechanism for mechanically delaying the initiation of retraction of each shoe assembly of said second group of shoe assemblies such that during a first interval of time said drive arrangement partially retracts said shoe assemblies of said first group of shoe assemblies while said shoe assemblies of said second group of shoe assemblies are radially stationary and during a second subsequent interval of time said drive arrangement fully retracts each shoe assembly of said plurality of shoe assemblies;

whereby said shoe assemblies of said plurality of shoe assemblies cooperate to form a substantially continuous backup about an internal joint formed between the two tubular workpieces when said shoe assemblies are each in said extended position.

2. The internal welding fixture of claim 1, wherein each shoe assembly of said plurality of shoe assemblies lies substantially in a single radial plane when each said shoe assembly of said plurality of shoe assemblies is in said extended position.

3. The internal welding fixture of claim 1, further comprising a central mast defining said axis and wherein said drive arrangement includes a cylindrical portion adapted to move along said central mast.

4. The internal welding fixture of claim 3, wherein each shoe assembly of said plurality of shoe assemblies is moved between said contracted position and said extended position in response to advancement of said cylindrical portion.

5. The internal welding fixture of claim 4, wherein each shoe assemblies of said plurality of shoe assemblies is pivotally interconnected to said cylindrical portion through a first support arm.

6. The internal welding fixture of claim 5, wherein said delay mechanism comprises a plurality of slip joints, at least one slip joint being operatively associated with each shoe assembly of said second group of shoe assemblies.

7. The internal welding fixture of claim 6, wherein each of said shoe assemblies of said plurality of shoe assemblies is pivotally interconnected to said central mast through a second support arm.

8. The internal welding fixture of claim 7, wherein said delay mechanism includes first and second slip joints associated with each shoe assembly of said second group of shoe assemblies.

9. The internal welding fixture of claim 7, wherein each shoe assembly of said second group of shoe assemblies further comprises a first pin pivotally interconnecting said first arm to said cylindrical portion and a second pin interconnecting said second arm to said central mast, and further wherein each slip joint includes an elongated aperture through which each pin is permitted to pass.

10. An internal welding fixture for use in joining two tubular workpieces, the fixture comprising:

a plurality of shoe assemblies including a first group of shoe assemblies and a second group of shoe assemblies, each shoe assembly of said plurality of shoe assemblies being radially arranged about an axis and each shoe assembly of said plurality of shoe assemblies further being radially moveable between a contracted position and an extended position;

a drive arrangement including a single piston rod operatively interconnected to each shoe assembly of said plurality of shoe assemblies for moving each shoe assembly of said plurality of shoe assemblies between said contracted position and said extended position;

a delay mechanism for mechanically delaying the initiation of retraction of each shoe assembly of said second group of shoe assemblies; and a locating arrangement comprising a plurality of actuators each including an extendable arm portion moveable between an actuated position and a non-actuated position, each actuator of said plurality of actuators being equally spaced radially about the axis;

whereby the locating arrangement is adapted to radially center the internal welding fixture with respect to one of the first and second tubular workpieces.

11. The internal welding fixture of claim 10, wherein each actuator of said plurality of actuators comprises a hydraulic cylinder.

12. The internal welding fixture of claim 11, wherein said locating arrangement further comprises a first plurality of wheels, said first plurality of wheels being equally spaced radially about the axis.

13. The internal welding fixture of claim 12, wherein each wheel of said first plurality of wheels radially extends beyond said plurality of shoe assemblies when said shoe assemblies are in said contracted position.

14. The internal welding fixture of claim 13, wherein said locating arrangement further comprises a mounting bracket, each of said actuators and each of said wheels being attached to said mounting bracket.

15. An internal welding fixture for use in joining first and second tubular workpieces, the fixture comprising:

a plurality of shoe assemblies including a first group of shoe assemblies and a second group of shoe assemblies, each shoe assembly of said plurality of shoe assemblies being radially arranged about an axis, and each shoe assembly of said plurality of shoe assemblies further being radially moveable between a contracted position and an extended position;

a drive arrangement operatively interconnected to each shoe assembly of said plurality of shoe assemblies for moving each shoe assembly of said plurality of shoe assemblies between said contracted position and said extended position;

a delay mechanism for mechanically delaying the initiation of retraction of shoe assemblies of said second group of shoe assemblies such that during a first interval of time said drive arrangement partially retracts said shoe assemblies of said first group of shoe assemblies while said shoe assemblies of said second group of shoe assemblies remain radially stationary and during a second subsequent interval of time said drive arrangement mechanism retracts each shoe of said plurality of shoe assemblies, said delay mechanism comprising plurality of slip joints, at least one slip joint being a operatively associated with each shoe assembly of said second group of shoe assemblies; and a locating arrangement including a plurality of actuators radially arranged about said axis, each actuator of said plurality of actuators including an arm moveable between an actuated position and a non-actuated position, said locating arrangement being adapted to radially center the internal welding fixture with respect to one of said first and second tubular workpieces.

16. The internal welding fixture of claim 15, wherein each shoe assemblies of said plurality of shoe assemblies is pivotally interconnected to said cylindrical portion through a first support arm.

17. The internal welding fixture of claim 15, wherein said drive arrangement includes a single piston rod operatively interconnected to each shoe assembly of said plurality of shoe assemblies.

18. The internal welding fixture of claim 15, wherein said locating arrangement further includes a mounting bracket and a plurality of wheels attached to said mounting bracket, each of said actuators being attached to said mounting bracket.

19. The internal welding fixture of claim 15, wherein each of said shoe assemblies of said plurality of shoe assemblies is pivotally interconnected to said central mast through a support arm.

20. The internal welding fixture of claim 19, wherein said delay mechanism includes first and second slip joints associated with each shoe assembly of said second group of shoe assemblies.

* * * * *